United States Patent [19]
Hancock et al.

[11] Patent Number: 5,642,106
[45] Date of Patent: Jun. 24, 1997

[54] VISUAL INCREMENTAL TURN DETECTOR

[75] Inventors: Thomas R. Hancock; Stephen J. Judd, both of Plainsboro, N.J.; Carol L. Novak, Newtown, Pa.; Scott T. Rickard, Jr., Plainsboro, N.J.

[73] Assignee: Siemens Corporate Research, Inc., Princeton, N.J.

[21] Appl. No.: 364,880

[22] Filed: Dec. 27, 1994

[51] Int. Cl.⁶ .................................................. G08G 1/123
[52] U.S. Cl. ...................... 340/988; 340/475; 364/450; 348/147; 250/203.6; 250/231.12; 382/289
[58] Field of Search .................... 340/988, 995; 364/444, 447, 449, 424.02, 450; 348/147; 250/203.6, 203.7, 206.1, 206.2, 231.12, 231.13; 73/504.01, 504.02, 504.03, 504.8; 382/289

[56] References Cited

U.S. PATENT DOCUMENTS

| | | | |
|---|---|---|---|
| 4,870,694 | 9/1989 | Takeo | 382/289 |
| 4,922,543 | 5/1990 | Ahlbom et al. | 382/289 |
| 4,987,357 | 1/1991 | Masaki | 340/988 |
| 5,060,276 | 10/1991 | Morris et al. | 382/289 |
| 5,075,864 | 12/1991 | Sakai | 364/450 |
| 5,095,199 | 3/1992 | Selby et al. | 250/203.6 |
| 5,155,684 | 10/1992 | Burke et al. | 364/424.02 |
| 5,177,685 | 1/1993 | Davis et al. | 364/443 |
| 5,208,750 | 5/1993 | Durami et al. | 340/988 |
| 5,212,643 | 5/1993 | Yoshida | 364/449 |
| 5,223,702 | 6/1993 | Conley | 250/203.6 |
| 5,262,775 | 11/1993 | Tamai et al. | 340/995 |
| 5,283,575 | 2/1994 | Kao et al. | 340/990 |
| 5,291,412 | 3/1994 | Tamai et al. | 364/449 |
| 5,291,413 | 3/1994 | Tamai et al. | 364/449 |
| 5,291,414 | 3/1994 | Tamai et al. | 364/449 |
| 5,303,159 | 4/1994 | Tamai et al. | 364/449 |
| 5,311,434 | 5/1994 | Tamai | 364/449 |

OTHER PUBLICATIONS

Zhang et al., "Segment-Based Matching For Visual Navigation", Computer and Information Science, University of Massachusetts at Amherst, Coins TR91-35, pp. 1-37 (Apr. 1991).

Oh et al., "A study of the characteristics of an omnidirectional vision sensor", Advances in Image Processing, SPIE vol. 804, pp.259-268 (1987).

Zheng et al., "Panoramic Representation for Route Recognition by a Mobile Robot", International Journal of Computer Vision, 9:1, pp. 55-76 (1992).

Hong et al., "Image-Based Navigation Using 360o Views", Proc. of Image Understanding Workshop, pp. 782-791 (1990).

Oh et al., "Guidance of a Mobile Robot Using an Omnidirectional Vision Navigation System", Mobile Robots II, SPIE vol. 852, pp. 288-300 (1987).

Yagi et al., "Panorama Scene Analysis with Conic Projection", IEEE International Workshop on Intelligent Robots and Systems, IROS, pp. 181-187 (1990).

Zipser, "Biologically Plausible Models of Place Recognition and Goal Location", Chapter 23, pp. 432-470.

*Primary Examiner*—Thomas Mullen
*Assistant Examiner*—Benjamin C. Lee
*Attorney, Agent, or Firm*—Adel A. Ahmed

[57] ABSTRACT

A visual gyroscope system for detecting turns and straight line travel of a vehicle includes a visual image detector mounted on the vehicle, for producing sequential and successive digitized image data strips containing information identifying scenery about the vehicle at associated successive locations along the route travelled. A processor is programmed to extract from image detector each successive pair of image data strips, and rotate the second occurring strip of each pair until it matches the first occurring strip to obtain the incremental rotation and direction of rotation of the vehicle in its travel between strips. The incremental rotations between strips are accumulated and summed to obtain the total rotation upon completion of a turn, and along with the direction of rotation, identification of a right turn, left turn, u-turn, or straight line travel. Dead reckoning navigation is also provided via the inclusion of an odometer, for providing distance readings for the distance travelled between each successive image data strip.

13 Claims, 10 Drawing Sheets

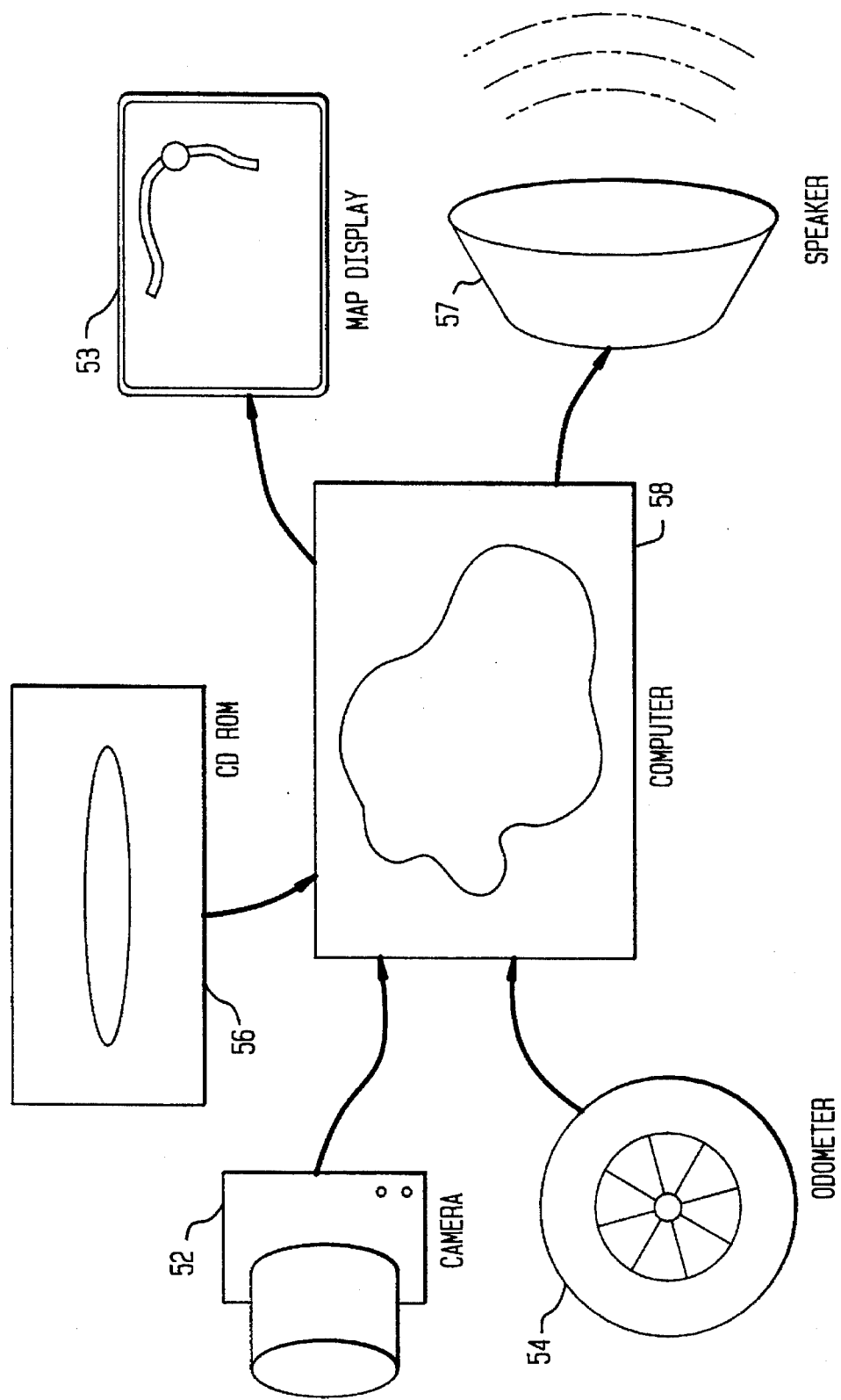

5,642,106

VISUAL INCREMENTAL TURN DETECTOR

RELATED APPLICATIONS

This application is related to co-pending applications Serial No. 08/364,879 (Attorney Docket No. 94E7541), entitled "Omnidirectional Visual Sensor and Processor", filed on Dec. 27, 1994; and Serial No. 08/364,885 (Attorney Docket No. 94E7618), entitled "Discoidal Visual Image Detector", filed on Dec. 27, 1994; and Serial No. 08/364,160 (Attorney Docket No. 94E7601), entitled "Method and Apparatus for Automatically Tracking The Location of Vehicles", filed on Dec. 27, 1994. The teachings of the co-pending applications are incorporated herein by reference to the extent they not do conflict with the teachings herein.

FIELD OF THE INVENTION

The field of the present invention is generally related to navigational systems for vehicles, and is more particularly related to systems for detecting instantaneous turning of a vehicle, and the direction of travel.

SUMMARY OF THE INVENTION

An object of this invention is to provide improved apparatus for computing an estimate of instantaneous turning of a vehicle, particularly for use in automatic vehicle location systems, and robotic navigational systems.

The turn or direction detecting apparatus is provided by securing an omnidirectional visual image detector means to the vehicle, for obtaining an image signal representative of a horizontal view of the surroundings at a given elevation, that is a panoramic view of up to 360° about a reference point associated with the vehicle. Digital signal processing means provide digitized image data strips representative of information identifying scenery about the vehicle at successive locations along a route travelled by the vehicle. As the vehicle travels along the route, processing means extract each successive pair of image data strips as they occur, and rotates the second occurring image data strip of each pair until a best match is obtained with the first occurring image data strip of the pair, whereby the amount of rotation necessary to obtain the match is indicative of the turn increment and direction, with successive such turn increments being accumulated and added until completion of the turn, for providing the total rotation and direction of the turn. Odometer means is included for providing the distance travelled by the vehicle in making each turn increment. Dead reckoning means may be included to process the odometer readings along with the turn increments and an initial starting point location for vehicle travel, for locating the vehicle by dead reckoning as it travels away from the starting point.

BRIEF DESCRIPTION OF THE DRAWINGS

Various embodiments of the present invention are described in detail below with reference to the accompanying drawings, in which like items are identified by the same reference designation, wherein:

FIG. 1A is a simplified block schematic and pictorial representation of one embodiment of the invention.

DETAILED DESCRIPTION OF THE INVENTION

Figure 1B:
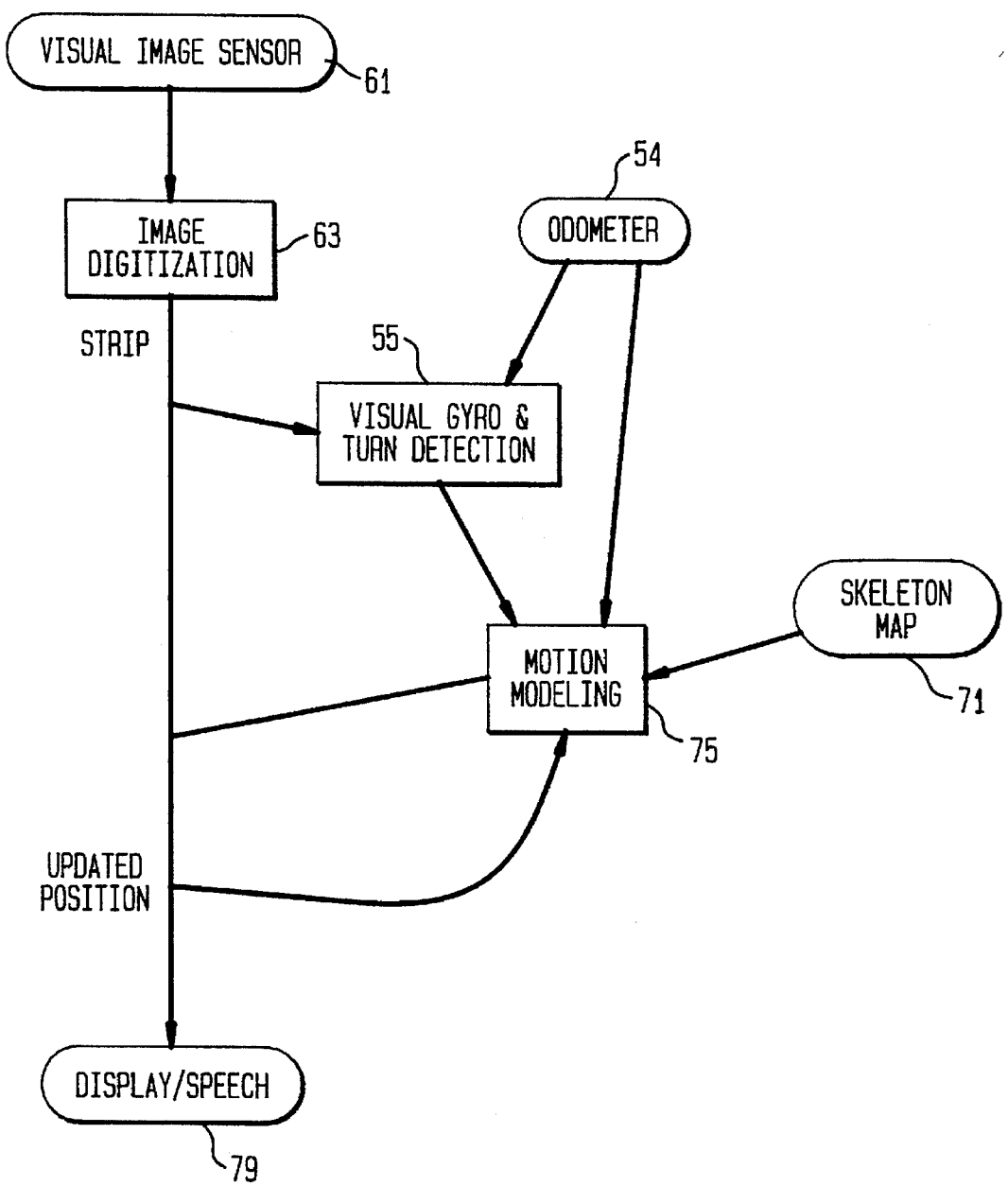
FIG. 1B is a block schematic diagram showing a dense tracking embodiment of the invention.

With reference to FIG. 1A, a simplistic pictorial representation of a system of one embodiment of the invention for installation in a vehicle is shown. Included in the system are a visual image camera 52 or optical detector, an odometer 54, a CD ROM 56 or other storage device, a computer 58, perhaps a display or video monitor 53 for showing a map display, and/or an audio system 57 represented by a speaker. The odometer 54 can either be an independent odometer, such as the typical odometer wheel installed on vehicles for very accurately tracking the distance travelled by the vehicle, or can be a specialized odometer that is also part of the vehicle odometry system. The visual image camera 52 is in a preferred embodiment of the invention of a unique and novel design, as described in detail below. The CD ROM 56 is a typical off-the-shelf ROM for storing on a computer disk digitized information. The display 53 includes a scrolling digitized road map (not shown), on which the associated vehicle's position is displayed for a real-time prototype system incorporating various embodiments of the invention. Also, the CD ROM 56 may be used to store digitized video information representing target locations of image data obtained by driving an associated vehicle over a known course in which it is desired to accurately locate a vehicle during its subsequent trips over or within the same roadway. The computer or microprocessor 58 is programmed for processing with the appropriate algorithms the odometer data obtained from odometer 54, and visual image information obtained from camera 52, along with previously recorded data obtained from the CD ROM 56, for operating both the map display 53 to show the location of a vehicle thereon, and the audio system or speaker 57 to tell a driver of a vehicle when to turn, and which way to turn, in order to stay on a predetermined route, and/or to periodically provide a driver with an announcement of the vehicle's location.

Omnidirectional Visual Image Detector:

The video camera 52 as previously generally represented, is in a preferred embodiment of the invention provided by an omnidirectional visual image detector and processor, which will now be described in detail with reference to FIGS. 2 through 14. As shown in the simplified pictorial illustration of FIG. 2, in one embodiment of the invention up to a 360° panoramic picture of the horizontal surroundings of an object at a given elevation is obtained by reflecting light rays 2 from the surroundings off of a reflective spherical or cone-shaped reflective means 4, in this example. The resultant 360° image is reflected through a focusing lens 6 to a camera or visual image detection means 8 mounted on a base member 10. A protective housing 12 encloses the apparatus, whereby the housing 12 has sufficient transparent areas or windows for permitting necessary light to travel to the reflective means 4. The reflective means 4 may be rigidly mounted to the top 14 of the housing 12. More specifically, in an engineering prototype of the invention, the housing 12 is transparent, at least above the lens 6 in the area surrounding the reflective means 4. In this example, the reflective means 4 is a hemisphere having a reflective coating, such as a mirrored coating. Both the lens 6 and the reflective hemisphere 4 can consist of injection molded plastic material. In this example, a charge coupled device (CCD) optical detector array chip 16 is rigidly mounted below the other side of lens 6 away from the reflective hemisphere 4, for receiving reflective images therefrom. CCD 16 converts the reflected image into an electrical video signal representative of the image. The CCD chip 16 is mounted on a printed circuit (PC) board 18. Also mounted on the PC board 18 is a video signal processing chip 20, as shown. The inventors believe that the length $L_1$ of a practical strip extractor device from FIG. 3 can be as small as six centimeters. However, depending upon the application, larger or even smaller such devices may be required.

Figure 4A:
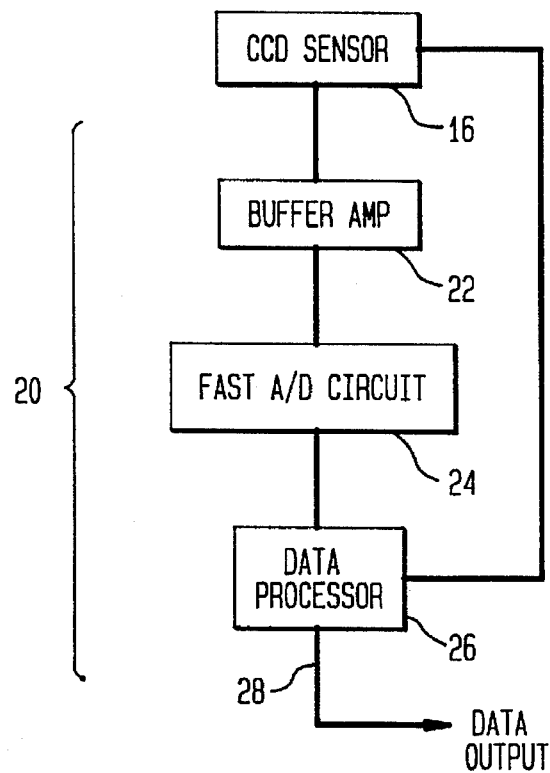
FIG. 4A is a simplified block schematic diagram of the embodiment of the invention of FIG. 3.
Figure 4B:
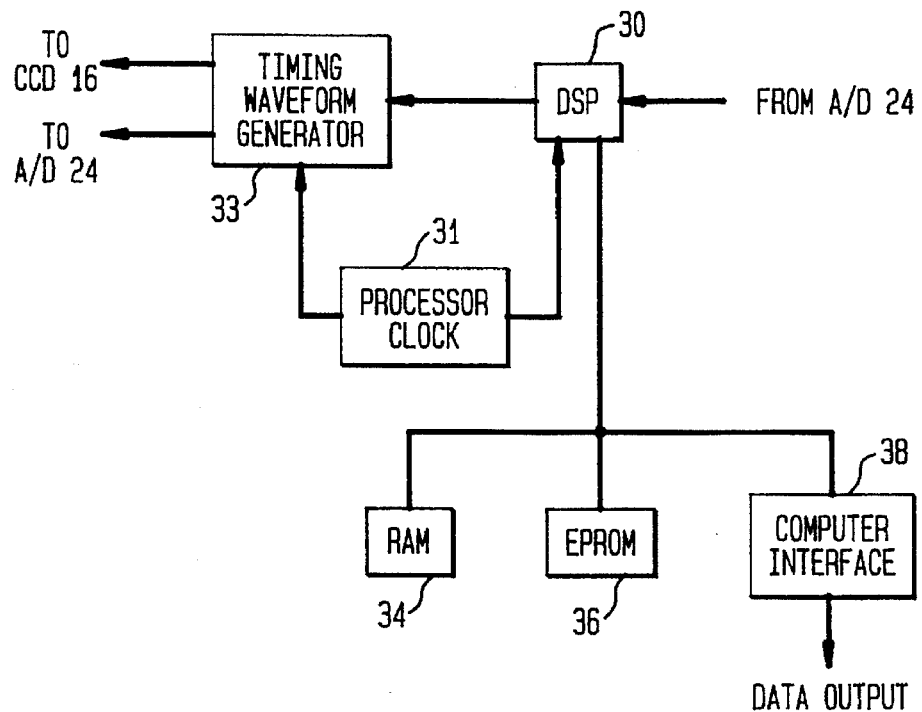
FIG. 4B is a block schematic diagram of the data processor of FIG. 4A.
Figure 4C:
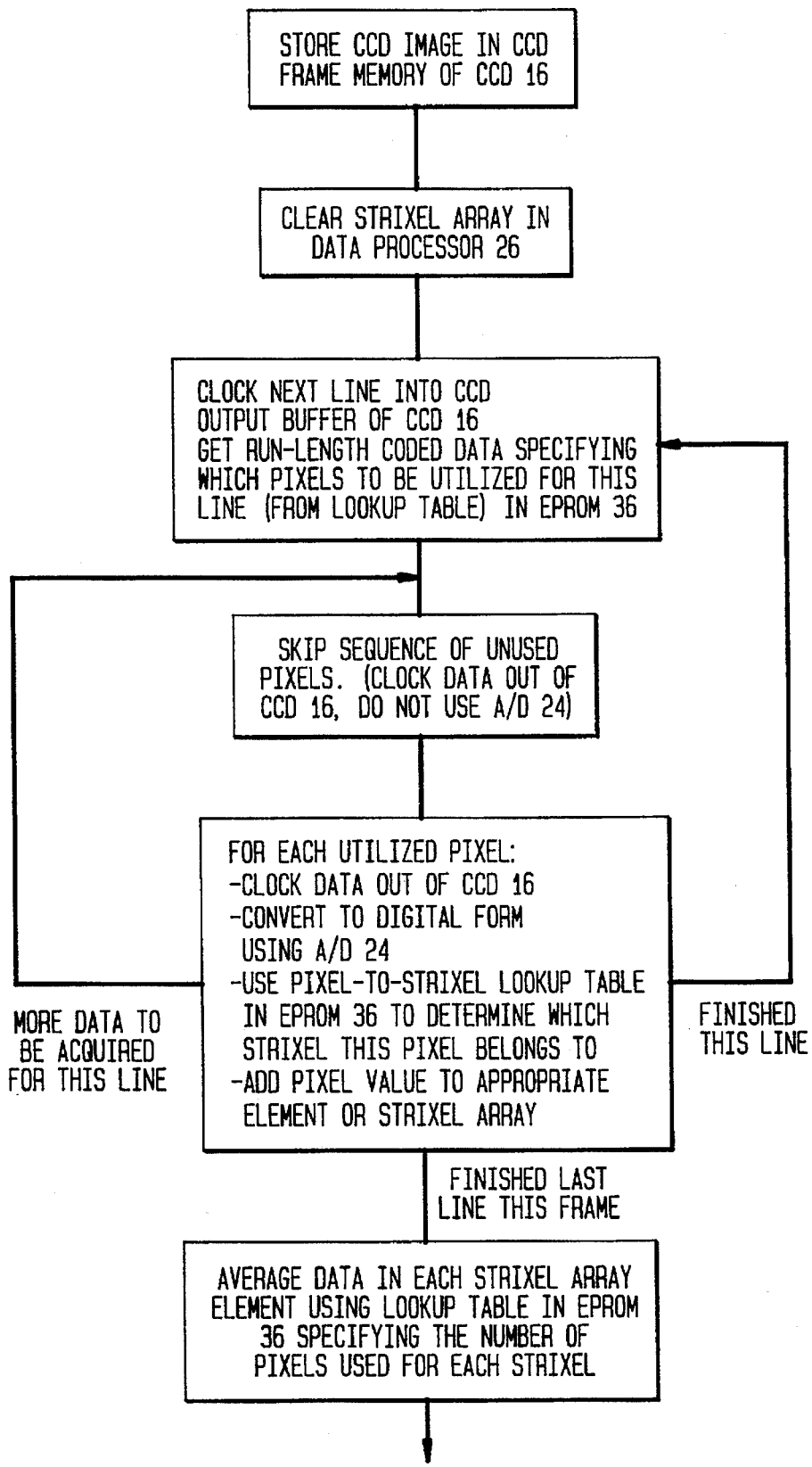
FIG. 4C is a flowchart for one embodiment of the invention, for processing the image data.

With reference to FIGS. 4A, 4B, and 4C the basic electronics for one embodiment of the invention will now be described. The CCD sensor 16 is connected through a buffer amplifier 22 to a fast analog-to-digital A/D circuit 24 for converting the image information from an analog signal to a digital signal, for processing by a data processor 26. The data output from data processor 26 is connected by a bus 28 to a central processor unit CPU (not shown), for example, for use with algorithms to determine navigational parameters and controls for both indoor and outdoor vehicles, such as robots, or for vehicle locator systems.

A block diagram of the data processor 26 is shown in FIG. 4B, and includes a digital signal processor chip (DSP) 30, a random access memory (RAM) 34, an erasable programmable read only memory (EPROM) 36, and a computer interface 38. In an engineering prototype for one embodiment of the invention, the various components used will now be identified via part number and manufacture, where applicable. The CCD sensor 16 consists of an approximately ½ inch CCD sensor or array, Part No. TC2XX FAMILY, manufactured by Texas Instruments, Inc., Houston, Tex. Note that the TC2XX requires an appropriate clock driver manufactured by Texas Instruments, Inc. The focusing lens 6 is typically provided by a convex lens of appropriate focal length. The reflective hemisphere 4 is 1.25 inches in diameter. The approximate distance between the lens 6 and the bottom of the hemisphere 4 is about 0.75 inch. The hemisphere 4 is rigidly mounted in the center of a 2.5 inch diameter disk 14. The cylindrical housing 12, in this example, consists of Lexan®. Lexan® is used because it exhibits less distortion then polystyrene, for example, of surrounding light passing therethrough to the hemisphere 4.

The buffer amplifier 22 can be provided by any integrated circuit providing appropriate impedance matching, level shifting and scaling of pixel data, between CCD 16 and A/D 24. The A/D 24 may be provided by a Part No. MP87XX FAMILY, manufactured by MicroPower Systems, Santa Clara, Calif. The digital signal processor chip (DSP) 30 is provided by any part of a family of Part No. TMS320C3X/4X/5X, manufactured by Texas Instruments, Inc., Houston, Tex. The RAM 34 may be an integrated circuit Part No. Cy7CXXX FAMILY, manufactured by Cypress Semiconductor, San Jose, Calif. The EPROM 36 may be an integrated circuit Part No. TMS27CXX FAMILY, manufactured by Texas Instruments, Inc. The computer interface 38 can be provided by an appropriate driver or buffer amplifier for transferring image data to the computer 58. Also, a typical regulated power supply (not shown), for supplying DC voltages, can be used.

Operation of various embodiments the present invention will now be described in greater detail.

Figure 2:
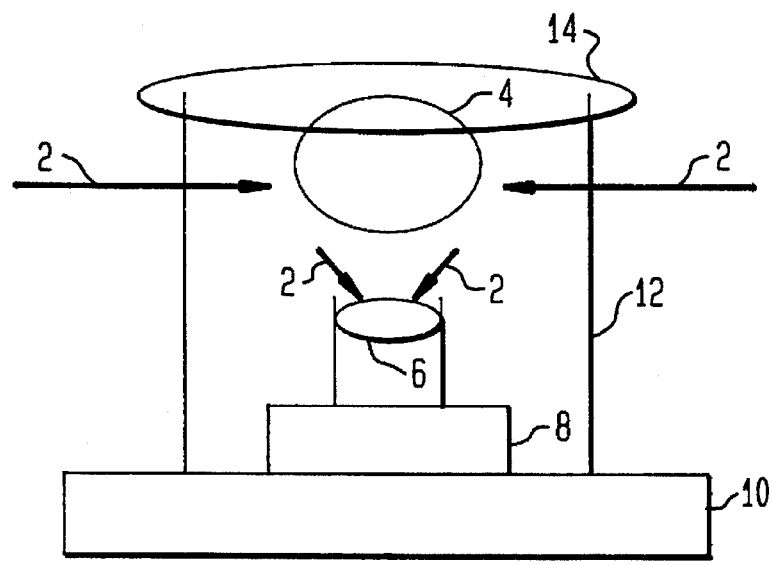
FIG. 2 is a simplified pictorial representation of another embodiment of the invention.

The omnidirectional visual image detector of FIG. 2 can be oriented as shown with the hemispherical reflective ball 4 pointed downward, for permitting the assembly to be installed on top of a vehicle, to provide strip mapping of the total surroundings about the vehicle as it is driven over a selected route. Alternatively, the assembly of FIG. 2 can be placed inside of a vehicle by orienting the assembly so that the hemisphere 4 is pointing upward, to also provide the strip mapping.

Figure 3:
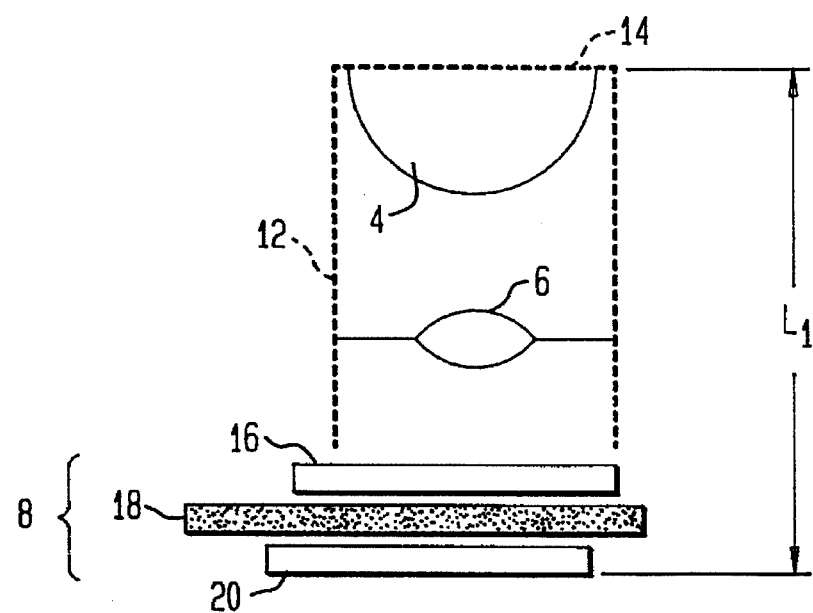
FIG. 3 is a pictorial representation of components used in an engineering prototype of the embodiment of the invention of FIG. 2.
Figure 5:
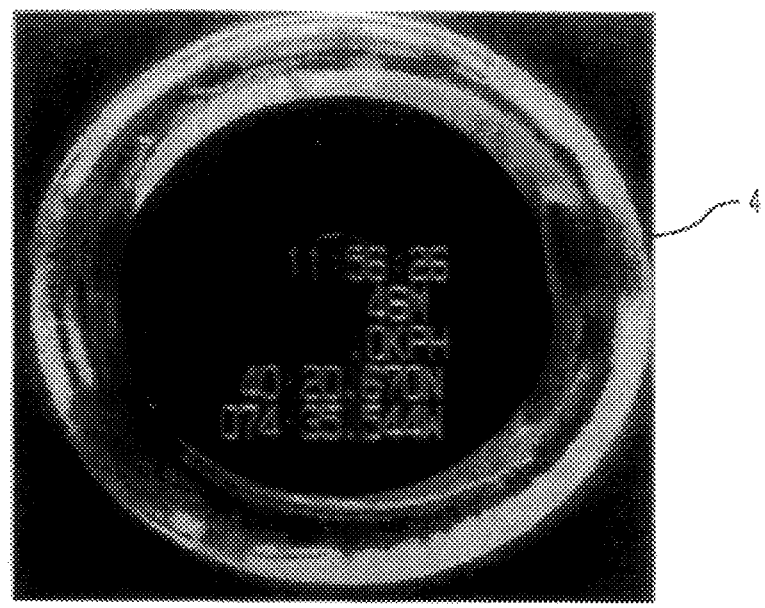
FIG. 5 is a photograph of a sample image viewed by a visual image camera in association with the embodiment of the invention of FIGS. 2 and 3.
Figure 6:
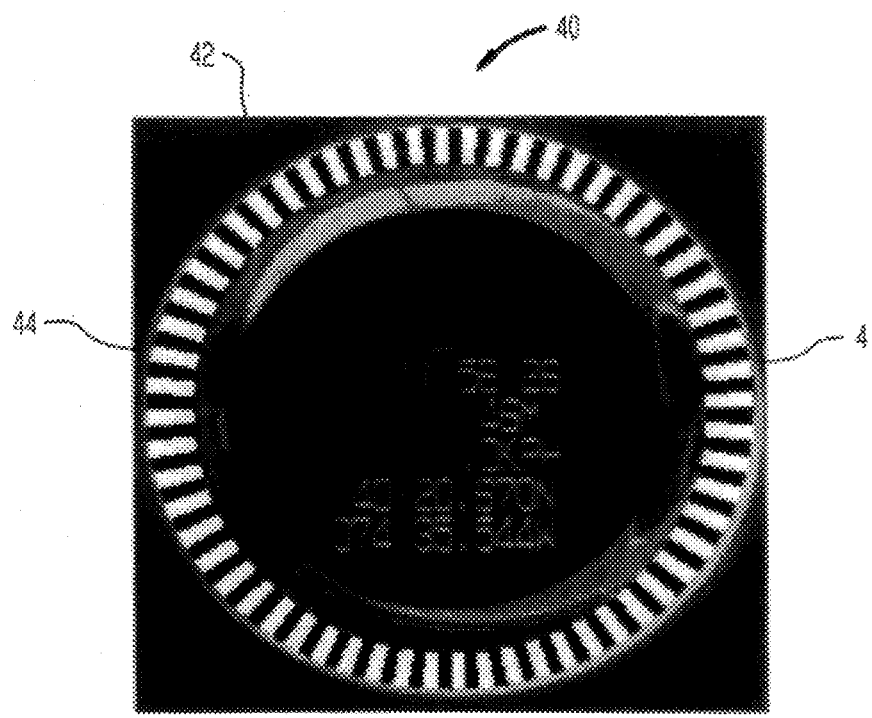
FIG. 6 illustrates a circular band of pixel locations extracted from the image of FIG. 5, for effectively compressing the video data representation of a 360° picture, in this example, of the horizontal surroundings at a given elevation and location of an associated vehicle or robot, for an embodiment of the invention.

Assume that the detector assembly of FIG. 3 is mounted vertically, whereby the reflective hemisphere 4 is positioned for receiving up to a 360° panoramic picture of its horizontal surroundings at a given elevation. The images from the reflective hemisphere 4, in this example, are reflected through lens 6 for focusing on the CCD array 16. A sample of an image so projected is shown in FIG. 5, looking upward from the lens 6 at the reflective hemisphere 4. The CCD array 16 converts the light images into a video information signal or "pixel information". Note that the horizontal view of the surroundings reflected from hemisphere 4, as shown, are represented by a circle of information appearing on the image plane. The width of the circle is dependent on the elevation and amount of horizontal picture required for the particular application. The resultant video or image ring 40, as shown in FIG. 6, is mapped to pixel locations represented by the alternating white 42 and black 44 radial segments of video or image ring 40. Note that the image information of ring 40 is divided into equal radial segments, with each segment representing a certain angular displacement from the front of the picture.

Figure 7:
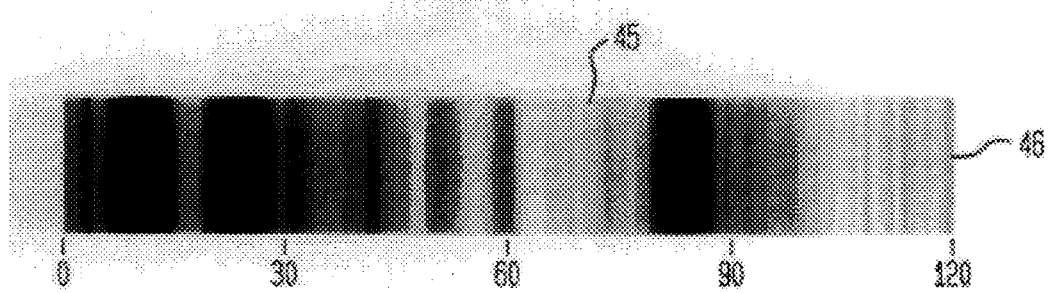
FIG. 7 shows an example of a strip of 120 pixel locations extracted from the picture or image of FIGS. 5 and 6, for an embodiment of the invention.

With reference to FIG. 4A, the image information from CCD sensor array and circuit 16 is passed through a CCD driver circuit and buffer amplifier 22 to the fast A/D converter circuit 24 (three may be required for color), for converting the information from an analog signal into digital signals. The digitized image information is then processed by the data processor 26 for extracting digital data representing the relative intensities of the pixel locations within the image ring 40. All other video information not within image ring 40 is discarded, resulting in a compression of the image data. An example of a data strip extracted from the pixel locations of video ring 40 is shown in FIG. 7. The extracted data represents the relative intensity (contrast) of light at each of the 120 pixel locations, in this example. The strip extraction process is described in greater detail below.

With further reference to FIGS. 4A, 4B, and 4C, operation of the data processor 26 will now be described. The CCD sensor array 16 converts the pictorial information into "pixel form", which is temporarily stored therein, and clocked out via a control signal generated under program control within the DSP 30 for conversion to digital form by the A/D converter circuit 24. A second control signal is used to initiate the A/D 24 digitizations. The A/D 24 control signal is either generated under program control within the Digital Signal Processor (DSP) 30, or by digital logic which provides a sufficient delay from a pixel clock signal to allow the analog pixel data time to settle to the desired accuracy before initiation of the A/D 24 digitization. The digitized pixel data from A/D 24 is then either stored, under program control from within the DSP 30 to an internal RAM storage area of DSP 30, or external RAM 34 storage attached directly to the DSP 30 external address, data and control busses, for example. The digitized pixel information from the A/D converter circuit 24 so transferred into a random access memory (RAM) will be further processed by the digital signal processor 30.

Computer programs for operating the digital signal processor 32 are stored in a EPROM 36. The DSP 30 is programmed to extract the digitized image information from CCD 16, and process it for obtaining the "strip" of values extracted from the bins of pixels 42 and 44 of video ring 40. As a result of the processing by the digital signal processor 30, the angular image segments 42 and 44 are placed linearly and successively side by side for producing the strip of information shown in FIG. 7. Each "bin" value is provided as an individual stripe 45 of respective successive stripes 45 of strip 46. In the next step, the digital signal processor 30 is programmed to pass the image information strip to the computer interface circuit 38, for providing same as a data output signal to a computer or central processing unit, for utilization for vehicle navigation or locating purposes.

The DSP 30 is programmed for averaging all of the pixels in each of the alternating and successive bins of pixels 42 and 44 of the image ring 40. The DSP 30 is also programmed for outputting only information associated with these more limited data points or "bins" instead of the 78,408 points that typically are provided from a video camera or CCD array 16 after a determined period of time in milliseconds.

Note that in another embodiment of the invention the DSP 30 includes the RAM 34 and EPROM 36 on a single integrated circuit chip. However, depending upon the application, additional RAM 34 and EPROM 36 may be required off chip.

Detailed operation of an embodiment of the invention for FIGS. 4A, 4B, and 4C will now be described. The DSP 30, acting as a high-speed controller, controls the operation and acquisition of image data from the CCD circuit 16. A processor clock 31 supplies the fundamental timing signal for operation of the DSP 30. The DSP 30 controls both the integration (exposure) time of the CCD 16 and the latter's internal frame storage, and also controls the readout of line and pixel data from the CCD 16 for each frame through a timing waveform generator circuit 33. The A/D circuit 24 samples and converts the analog pixel data to digital form. The A/D 24 timing is either controlled directly from the DSP 30, or by a small amount of additional logic such as timing waveform generation circuitry 33, so that it is properly synchronized with a pixel data readout clock pulse (not shown). The DSP 30 can directly control the operation of the CCD 16 since it is not required that the CCD 16 operate with a fixed (non-varying) timing for exposure time and internal image storage and readout. Since DSP 30 generates clock signals using program loops, the timing of these signals is not exactly uniform. This scheme eliminates the necessity of circuitry to synchronize and acquire digital data from an imaging subsystem which uses internal clocks. As a result, this allows the DSP 30 to dynamically control the transfer of pixels between CCD 16 and A/D 24, and A/D 24 and DSP 30. This scheme also eliminates the need for clock generation circuitry to control the CCD 16 and A/D 24, and the need for synchronization of the DSP 30 with the A/D 24. This increases efficiency in several ways:

DSP 30 resources do not need to be spent on synchronization or interrupt servicing.

The DSP 30 can spend a variable amount of time to process data from each pixel, since it can control the timing of the acquisition of each pixel. This means that blocks of image data can be compressed as they are acquired, instead of storing the entire image in RAM 34 first.

A lower-cost A/D converter 24 can be used to achieve a specified frame rate, since all of the pixel data on each line is not used, and does not need to be converted to digital form. In the preferred embodiment, unneeded pixels are discarded by clocking them out of the CCD 16 at a relatively high rate in comparison with the conversion time of the low-cost A/D 24; the A/D converter 24 is not as a result burdened with digitizing these sequences of unneeded pixels. Unneeded pixels at the end of each line are discarded by clearing the CCD 16 output buffer (not shown) when the last needed pixel from each line has been digitized.

Unused lines at the top and bottom of each frame can be discarded by clocking unused sequences of lines into the CCD's 16 output buffer, followed by a clear operation on the output buffer.

For a given CCD 16 and A/D 24, the frame rate can be increased beyond the limits that would be obtained using the previous description of the data acquisition procedure, if some loss in vertical resolution can be tolerated in a given application. In this operating mode, the DSP 30 will clock groups (sequences) of lines into the CCD 16 output buffer without clocking pixel data out of the output buffer. In this mode, the charge representing analog pixel data from each vertical column in a line group will be summed in the associated output buffer pixel charge storage element of the CCD 16. The DSP 30 can then acquire the CCD 16 output buffer pixel data which is in the form of a single line representing the vertical summation of a group of lines. The advantage of the use of the DSP 30 to achieve this mode of video data acquisition also allows further flexibility in the vertical segmentation of the frame into groups of lines for efficiency in subsequent processing. The number of lines in each group of lines need not be identical throughout a frame. This can be used to advantage in two ways:

The smearing of video or image data across strixels (a strixel is the average of all pixels in a bin i) can be held approximately constant by using a variable number of lines per group. In this case, relatively more lines are assigned to groups for which the strixels are primarily oriented in either a horizontal or vertical direction, and relatively fewer lines are assigned to groups in regions which contribute to pixels which are primarily at either 45°, 135°, 225°, or 315°.

For a given exposure time and a given A/D 24 resolution, it may be desirable to accumulate charge across sequences of lines in regions of the image with low light levels. The dynamic range of portions of an image with low light levels (that produce CCD pixel output voltages which are close to the optical black output voltage of the CCD 16) will be quantized relatively coarsely in comparison to regions of the image with higher light levels. In this case, a reduction in vertical resolution in low-light regions of the image may be more than compensated for by improved resolution of the light levels in these portions of the image with a resultant increase in utility of this data to the algorithm. This mode of operation will be more efficient when the change in the image from frame to frame is small enough for good prediction of the light levels in segments of the next frame to be made based on the image in the current and previous frames.

The exposure time for each frame can be controlled dynamically, on a frame-by-frame basis, in order to optimize performance of the overall system. For any data from any given frame, it is possible that some portions of the frame are either under or overexposed, based on the dynamic range specifications of the CCD 16 and the A/D 24, coupled with variances in external lighting and the reflectances of objects in the scene. Additional data for under and overexposed regions can be acquired using the DSP 30 to change the integration time appropriately for proper acquisition of image data from these regions. After re-exposure, efficient acquisition of portions of image data can be accomplished using the previously described techniques for discarding lines and pixels.

At frame rates for which images do not change rapidly from frame-to-frame, the optimized integration times for each portion of the image can be computed from the current and previous frames for the next frame. A sequence of exposures followed by acquisition of image segments can then be used to generate a composite image without first acquiring the entire image containing portions of unusable data.

This method of acquiring data from different segments of the CCD 16 using different exposure times for each segment allows the use of either a lower-cost A/D 24, lower-cost CCD 16, or an effective increase in dynamic range for a system consisting of a given CCD 16 and A/D 24.

This method of acquiring data from different segments of the CCD 16 may also be used to increase the efficiency of the algorithm in cases where portions of the next frame image are predicted to not be useful to the algorithm, either due to light levels which are out of range of the ability of the system to resolve, or due to these portions of the surroundings contributing no useful information regarding the scene immediately surrounding the vehicle.

In order to achieve lowest overall system cost, it may be necessary to use additional RAM 34 and EPROM/PROM 36 with the DSP 30. This is based on the resolution of the CCD 16, the amount of image data that needs to be processed, the cost of the associated integrated circuits, and the amount of RAM 34 and EPROM/PROM 36 that are provided on-chip for a given DSP 30. These IC's (integrated circuits) would all be attached directly to the DSP 30 external address/data bus. A separate communications IC is not necessary, since the DSP chip 30 can also function as a communications device, although it may be useful to relieve the DSP 30 of the overhead associated with communications functions.

A range for the resolution for CCD 16 of 19,200 pixels to 307,200 pixels is believed adequate, dependent upon the application. The range of exposure time suitable for this type of sensor is from ½ sec to 1/15,000 sec., in this example, which is believed to be adequate depending on the application, and the previously described method for extending the dynamic range of the imaging system. Allowing a range of exposure times is analogous to being able to control the shutter speed of a camera—to control exposure based on lighting level.

In the above-described one embodiment of the invention, the CCD array 16 is as previously indicated a commercially available integrated circuit CCD. As such, the CCD array 16 is substantially rectangular or square, and will detect all of the image information reflected to it from the reflective hemisphere 4, whether within or outside of the image ring 40, such as the image information encircled by the image ring 40, for example. As a result of this the digital signal processor 30 must be programmed for extracting only the video information representative by the image ring 40, in this example, as described above. To accomplish this, one embodiment of the invention provides an algorithm that defines an ellipse on the reflective image. This requires the establishment of a number of key parameters, namely a center point ($C_x$, $C_y$), an inner and outer radius r and R, respectively, and an aspect ratio, $\alpha$. These parameters in the below algorithm are required due to having non-square pixels in the CCD array 16 or the A/D converter 24. Each pixel (x,y) in the image then has an elevation as shown below in equation (1):

$$e(x,y) = \sqrt{(C_x - x)^2 + \left(\frac{C_y - y}{\alpha}\right)^2} \qquad (1)$$

and an angle $$a(x,y) = a\tan 2\left(\frac{C_y - y}{\alpha}, C_x - x\right) \qquad (2)$$

Each pixel represented by the coordinates x and y belongs to a bin i iff r<e(x,y)<R and 360x i/B ≤a(x,y)<360X (i+1)/B, where B is the number of bins extracted. Next a strixel's value for bin i is calculated as the average of all pixels in bin i. Note that this computation is an approximation, and that the reflective hemisphere 4 is not perfectly spherical, sometimes requiring a calibration step for obtaining a strip 46 (see FIG. 7) representative of strixels evenly spaced about the CCD array 16. Note also that the various constants depend upon the exact CCD array 16, hemispherical reflector 4, lens 6, and A/D converter 24. However, the present inventors use radii that typically correspond to elevations between −3° and +30°, and typically use B=120 strixels.

In an engineering prototype for the present invention, the sensor based navigation extracts the strixels in software. The C-code program steps which perform the extraction are listed below, for example. The "strip_info" structure contains the pixel to strixel mapping information determined from a two-ellipse method. For each "bin," the average intensity of the pixels in that bin is calculated as follows in C-coded steps:

```
A.  /* function for strip extraction */
B.  void getStrip(int size,unsigned char *data,StripPix *strip_info)
C.  {
D.  register unsigned i,j,sum;
E.
F.  /* this call fills the global variable image_data */
G.  /* with the digitized image */
H.  getImage(size);
I.
```

-continued

```
J.  for(i=0;i<strip_info→nbins;i++) {
K.    sum=0;
L.    for(j=0;j<strip_info→bin[i].npts;j++) {
M.      sum+= (image_data[(strip_info→bin[i].pt[j].x+
N.      strip_info→bin[i].pt[j].y*image_w)]);
O.    }
P.    data[i]=(strip_info→bin[i].npts?sum/strip_info→bin[i].npts;
Q.    i>0?data[i-1]:0);
```

The above software implementation in an actual commercial product of the system will likely be more hardware oriented. This is shown in the flowchart of FIG. 4C, for another embodiment of the invention.

Figure 8:
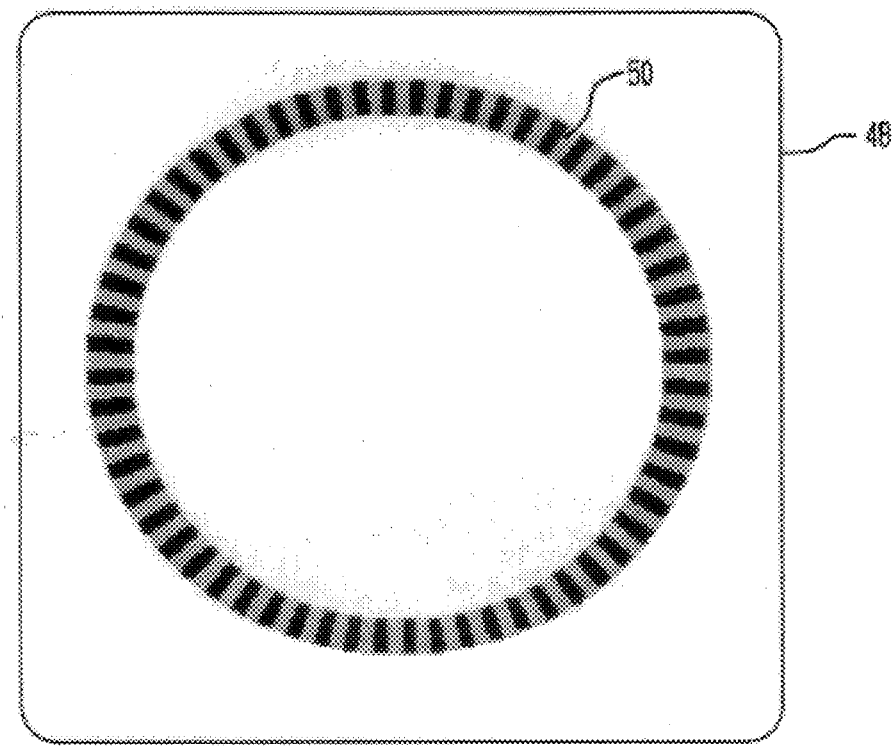
FIG. 8 is a simplified pictorial view of a customized CCD array for another embodiment of the invention.
Figure 9:
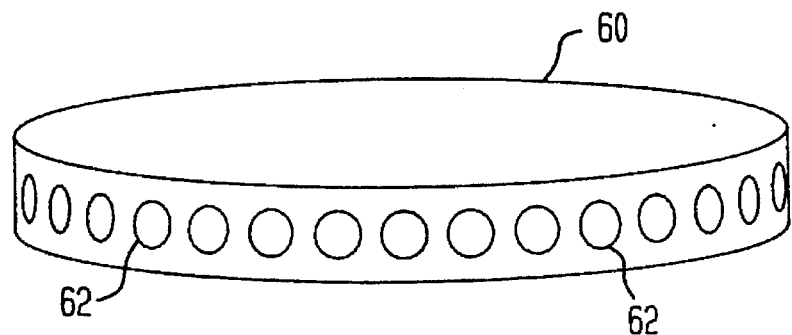
FIG. 9 is a pictorial view of an ommatidia disk light sensor for another embodiment of the invention.
Figure 10:
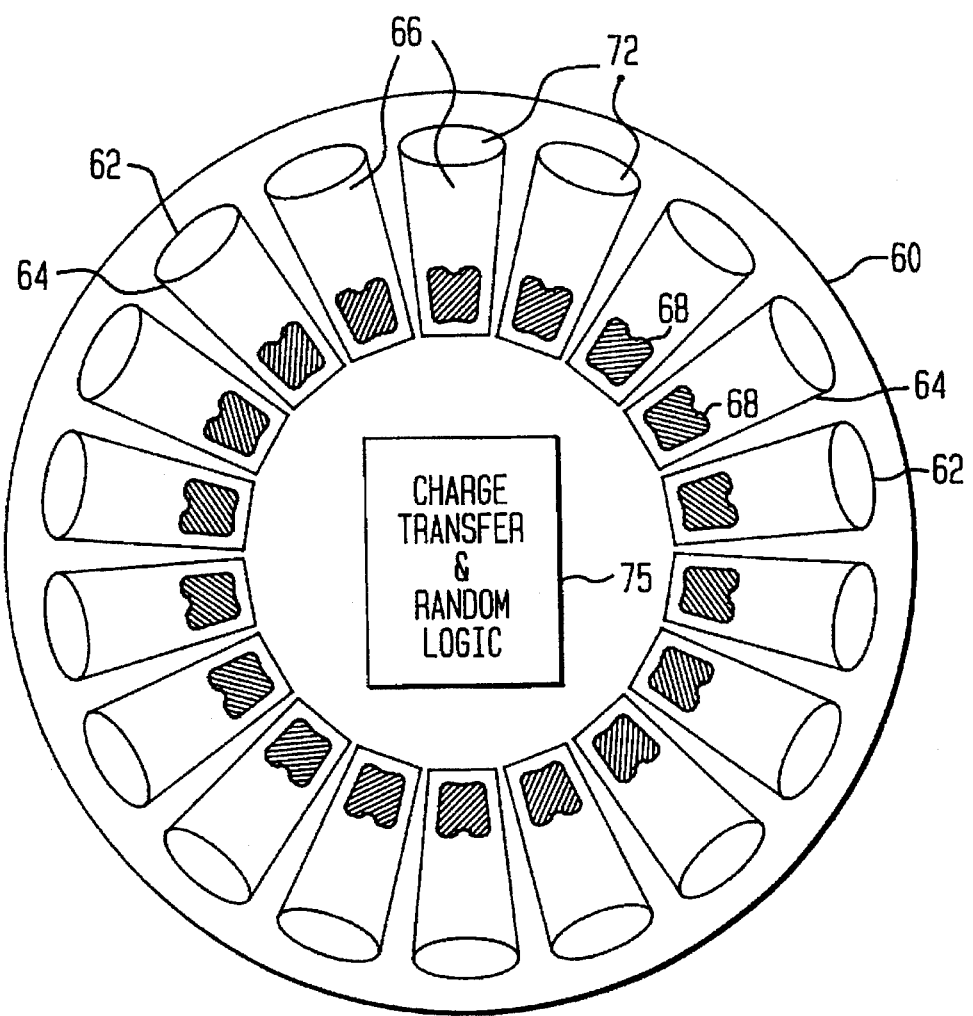
FIG. 10 is a top peel away or interior pictorial view of the ommatidia disk of FIG. 9.
Figure 11:
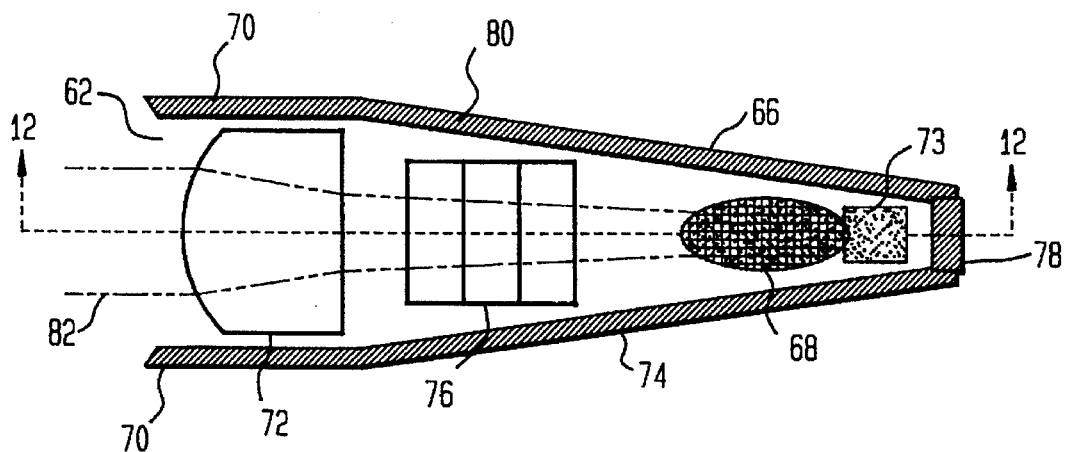
FIG. 11 is a top sectional view of one "capsule" of the ommatidia disk of FIG. 10.
Figure 12:
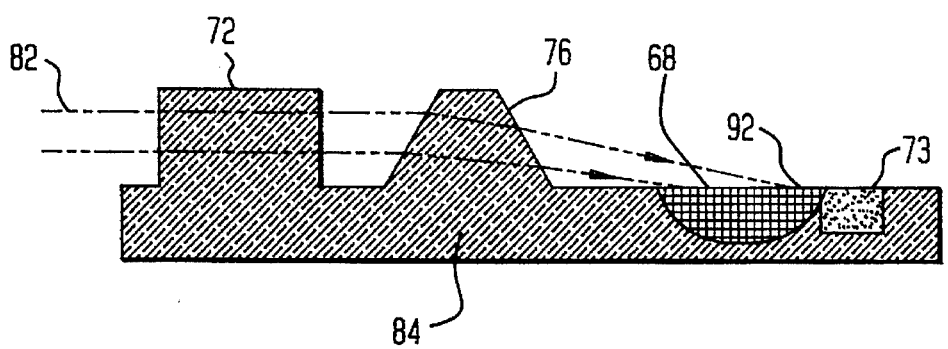
FIG. 12 is a cross sectional view taken along line 12—12 of FIG. 11.
Figure 13:
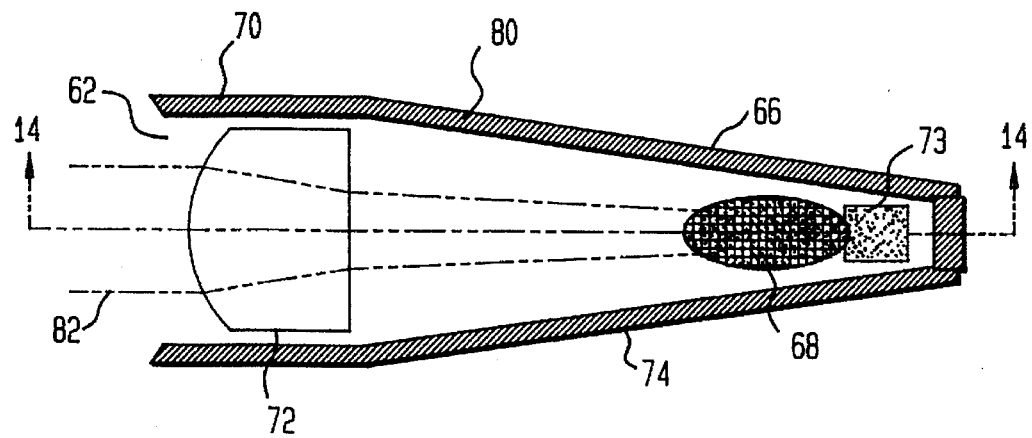
FIG. 13 is a top sectional view of an alternative embodiment for the capsules of the ommatidia disk of FIG. 10.
Figure 14:
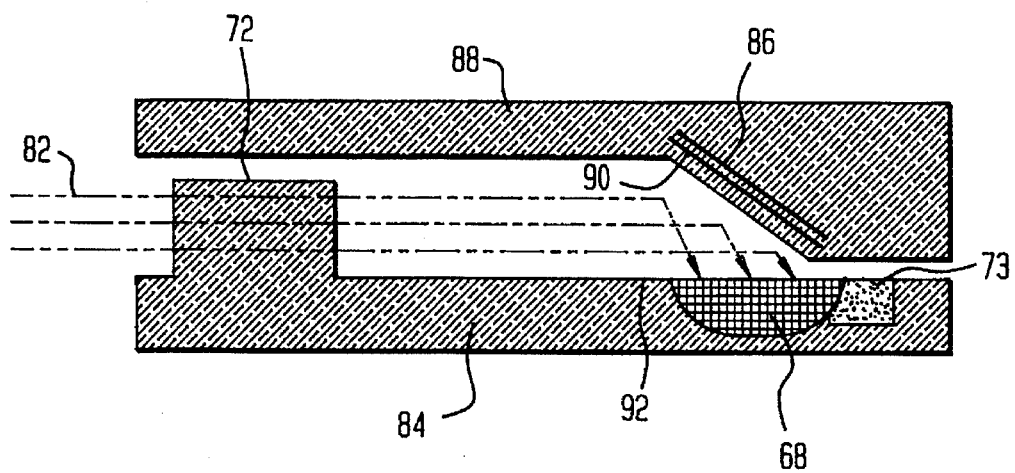
FIG. 14 is cross sectional view telecon along line 14—14 of FIG. 13.

In another embodiment of the invention, the present inventors recognize that the digital signal processor 30 can be simplified or eliminated by changing the above-illustrated CCD array 16 to have a customized configuration, for detecting image information only in a ring of sensors analogous to the image ring 40 of FIG. 6. Such a CCD array 48 is shown simplistically in FIG. 8 to have a ring 50 of successive bins 51 of CCD sensors corresponding to the alternating and successive bins of pixels 42 and 44 of image ring 40, respectively. Since a CCD array 48 as shown in FIG. 8 is not commercially available, such a device must be custom fabricated. However, the fabrication of such a CCD array 48 is well within the state-of-art of the present technology. For example, see "Electronic Engineer's Handbook", Third Edition, McGraw-Hill Book Company, pages 20-45 and 20-46. If such a CCD array 48 is employed, the DSP 30, for example, can be programmed to sequentially and successively transfer the images or pixels of bins 51 from CCD array 48, through A/D converter circuit 24, and into RAM 34 for temporary storage, or through computer interface 38 directly without first being stored. Regardless, the digitized image data from A/D converter circuit 24 is directly connected, or indirectly connected via EPROM 36, to the computer interface 38, for outputting the same to a CPU or computer, as previously indicated.

Color Image Detection:

In another embodiment a color CCD or color video camera means or color image detector 8 is used. Color is typically represented with three values. In most color cameras these values determine the amount of red, the amount of green and the amount of blue at each point, or pixel in the image. Such a system is called RGB for red/green/blue. The RGB values for each pixel provide three times as much information as the single value associated with intensity that is produced by gray-scale (also called black and white) cameras.

When regular strips 46 are detected, as previously described, the average intensity within each bin 42, 44, for example, of the annulus is recorded. However, when a color video camera or image detector means is used, the ability to record color information about each bin of pixels in addition to the average intensity level is obtained. In this case, for each bin an RGB value is detected and recorded, yielding a color strip 46 of successive color stripes 45.

These color stripes 45 may be more useful than the intensity-only ones. Color is a highly distinctive feature that may be used for distinguishing between strips 46. Two strips 46 may look the same in the intensity band and yet look very different when color is considered. This is because many different color values will be mapped to the same intensity value. Thus color provides the chance of greater distinctiveness between the individual stripes 45 when comparing two strips 46 for similarity, for example, thereby enhancing the accuracy of determining whether two strips 46 correspond to the same location.

One way in which the use of color may aid automatic vehicle location, for one application example, is in computing the degree of rotation via a visual incremental turn detector 55. Such a detector 55 (referred to herein as either a visual gyro or a visual incremental turn detector) operates by comparing the current strip 46 with all possible rotations of the previous strip 46 recorded along a road for an adjacent image or target, to see which one gives the best match. The best match is considered to give the most probably degrees of rotation, e.g., for a vehicle turning a corner. More sophisticated and efficient techniques might also be used to obtain sub-pixel resolution, as in standard egomotion calculation algorithms in computer vision.

The use of color may aid in determining the best rotation match. For example, a current strip 46 may have a fairly close match to more than the possible rotation of the previous strip 46. When color is considered, the possible matches between the strips 46 may become more distinctive, and the correct match becomes obvious.

There is more than one method to calculate the color values in the strips 46. One way is to determine the average color in each bin 42, 44. This is similar to the way intensity strips are computed. The red value for each bin is computed as the average of all the red components of the pixels in that bin. The green value is the average of all the green components of the pixels, and similarly for the blue.

A second method for calculating the color values in the strips 46, is to assign the brightest pixel in each bin as being representative of that bin. Each pixel in that bin is examined to determine which one is the brightest and the value of that pixel becomes the value associated with the bin. The brightness is computed as simply the average of the red, green, and blue values of each pixel.

A third method for calculating the color values in the strips 46 is to determine which pixel in each bin is the "most colorful", and assign that value as representative of the bin. The "most colorful" pixel is determined as that pixel of the bin being the furthest from medium gray by Euclidean distance measure. Medium gray is considered to have the RGB value of (127, 127, 127). The color distance C may be expressed as follows:

$$C = \sqrt{(R-127)^2 + (G-127)^2 + (B-127)^2} \qquad (3)$$

where R, G, and B are the actual values for red, green, and blue.

A fourth method for calculating the color values in the strips 46 is to determine which pixel has the best combination of brightness and difference from gray. The pixel in each bin with the best score is assigned as the characteristic value of that bin. The score S is calculated as follows:

$$S = \sqrt{(R-A)^2 + (G-A)^2 + (B-A)^2} + \sqrt{R^2 + G^2 + B^2} \qquad (4)$$

where A is the average of the RGB values of the pixel computed as follows:

$$A = \frac{R+G+B}{3} \qquad (5)$$

A fifth method for calculating the color values in the strips 46 is to divide all possible colors into a small set of characteristic colors. Then for each bin a histogram is computed to determine how many pixels are close to each color in the set. The set color with the most pixels similar to it is considered representative of the bin.

Regardless of which method is used to compute the color strips 46, the resulting color strips 46 are compared to each other by the standard distance metric to produce a degree of match. This match is used to determine rotation in the case of the visual gyroscope applications.

When the tracking system is turned on at the start of a journey within a premapped region, a gaussian mixture and a background probability are created as an initial guess of the vehicle location. Whenever a new odometer reading is received, the probability model must be updated to reflect that the vehicle has moved to a new location. Whenever a turn is detected, the probability model also needs to be updated to reflect the change in direction. In order to perform these updates, the tracking system uses a skeleton map of the environment.

A skeleton map 71 is a directed graph model of the streets together with certain metric information. It consists of nodes (usually corresponding to intersections) and edges. Each edge is tagged with distance and very coarse direction information. With such a skeleton map, the system can plan the shortest path between any two places, as well as project a new vehicle location after a movement.

Every place in the environment is represented by two numbers, a street segment number and an index to that segment. The index is defined by the distance (in meters) from the location to the start of that street segment.

When a new odometer 54 reading is received, the gaussian distributions are updated to reflect a new vehicle location. The update is quite straightforward. The gaussian means are shifted by the amount of vehicle movement since the last reading. Also, the gaussian deviations are increased according to an error model of the odometer. When the vehicle is near an intersection, there are several possible places where the vehicle may go after a movement. To model this situation, a gaussian is split into several new ones when the skeleton map indicates that this gaussian passes a graph node after a vehicle movement. The new gaussians may share the same probability and deviation, but if there is any reason to believe one gaussian has a higher probability than the others, the system accommodates this. For example, if a compass or gyroscope is available, it may suggest that the vehicle has just made a left turn. In this case, the gaussian representing the left-turn case can be assigned a higher probability than the other gaussians representing the right-turn and no-turn cases. A visual gyroscope 55, which detects turns by analyzing a stream of strips, is described below for another embodiment of the invention.

The system also has access to the skeleton map 71 that describes the topology of the roadway (distances between intersections and intersection angles), along with the sensory map database 69' of stored images. These inputs are combined to produce a new estimate of position, which will then become an input to the next iteration. The control flow of this algorithm is depicted in FIG. 1C.

The possible locations for the vehicle are determined by the sensory map 69'. This is a discrete and finite (though potentially very large) set. To model uncertainty in the estimate, the system's internal representation of position is probabilistic. The system maintains a set of probability values to denote the likelihood with which the vehicle may be at various different positions. This set of probabilities is stored in memory as an exhaustive list (rather than in some more compact, but less general, representation such as a mean and variance for an assumed Gaussian distribution). This generality works well for situations such as where there is a fork in the road, and disjoint clouds of probability split off on each path). Since the processing time grows with the number of positions against which the current image must be matched, it is important that the set of positions under consideration not grow too large.

Of key importance in preventing the system from considering too large a set of possible positions is the high accuracy of odometer 54 readings. Estimating position by odometry alone can give errors of less than 1% of the total distance travelled (as long as there are not branch points in the road that odometry cannot disambiguate).

Each iteration begins with motion modeling to calculate a predicted position (as a probability distribution) based on dead-reckoning. This procedure is as follows:

Initialize the probability distribution for the new position to be everywhere 0 (i.e. $P_i=0$ for all i).

For each position j assigned probability $p_j>0$ by the previous position (to speed up processing only check j's in the region of the database that had some probability on the previous iteration).

For each position i whose distance X from j is no more than d+10 meters and no less than d−10 meters:

* Compute the probability $p_x$ that the vehicle has moved forward X meters given that the odometer 54 reports d:

$$P_x = e^{-.5(\frac{x-d}{max(1,.2d)})^2} / (max(1,.2d)\sqrt{2\pi}) \quad (6)$$

[i.e. the probability of x according to a normal distribution of mean d and standard deviation max (1,.2d)].

* Let $\alpha$ be the relative change in heading between images i and j in degrees (as obtained by the skeleton map 71 at intersections, or as obtained from the sensory map images for gradual turns along a road). Compute the probability $p_\alpha$ that the vehicle has turned a degrees given visual gyro 55 turn sensor reports $\theta$:

$$P_x = e^{-.5(\frac{\alpha-\theta mod 360}{10})^2} / (10\sqrt{2\pi}) \quad (7)$$

i.e. the probability of $\alpha-\theta$ according to a normal distribution of mean 0 and standard deviation 10 degrees).

Add the product $p_j p_x p_\alpha$ to $P_i$.

Renormalize the probability distribution (i.e.

scale non-zero probabilities so they add up to 1).

The process is essentially to shift the previous position estimate the appropriate distance forward down the road. While the position is an arbitrary probability distribution, the change in position is modeled by a distance travelled that is Gaussian (aka normally distributed). The mean of this Gaussian is the increase in the odometer 54 reading since the last iteration. As a standard deviation, 20% of distance travelled or one meter is presently used, whichever is greater. The Gaussian is clipped at a 10 m radius from the mean, which is considered the maximum possible error in the reported change in the odometer 54 reading. A new position estimate is initialized by taking each position in the previous estimate that had non-zero probability and shifting that probability weight forward by the appropriate amount.

Vehicle heading information is used to help calculate the estimated next position. While such information could be obtained from gyroscope or differential odometer sensors, this extra hardware expense is avoided by using a visual gyroscope 55 based on the strip 46, as described herein. This provides an incremental turn for the current image relative to the previous image. This turn is used to modify the position in a fashion analogous to the odometer 54 as described in the immediately above procedure.

In one mode of operation, the visual gyroscope 55 is used to detect sharp turns explicitly. The visual gyroscope 55 includes processing that detects that a vehicle is currently in a turn. While this is the case, turn information and odometer 54 readings are accumulated (added together). Once the turn is ruled to be complete, the accumulated turn and distance readings are passed to the motion modelling 75.

To perform this processing efficiently the system must be able to quickly determine the distance between two database entries. This is accomplished by saving the database positions sequentially along strips of roadways and by tagging different entries at intersections where the vehicle may switch roads. Similarly, database entries are labeled with heading angles and road intersections in the skeleton map 71 are labeled with the turning angles.

After computing the new probability distribution, extremely low values are rounded down to zero to prevent the set of possible positions (and hence the processing time) from growing too large. This is currently implemented by taking the maximum probability value for any one position, and setting to zero any values less than $10^{-6}$ times this maximum value.

The system has been proven successful at deciding which option a vehicle has taken at intersections (turning right or left, or going straight), and tracking through u-turns.

In the visual incremental turn detector 55 embodiment of the present invention, the present inventors conceived a method for computing an estimate of instantaneous turning of a vehicle, such as an automobile or robot, by using a sequence of images taken from a vehicle in motion, with the images being obtained from the processing of the image data strip 46 of FIG. 7. The estimate of instantaneous turning provides information indicative of the direction a vehicle is turning within a sequence of images. The estimate obtained is in this example used to detect the turns of an associated vehicle's course of travel, by integrating the instantaneous measurements over a short period of time. In this manner, the system is able to identify left-turns, right-turns, u-turns, and other types of turns, and to distinguish them from periods of time where the vehicle is heading in a straight line. When used in combination with the odometer 54, and a map display 53 of local streets, the system is able to show a vehicle's position on a map display 53 as the vehicle makes a journey, regardless of whether the vehicle is heading straight, or making turns. Alternatively, the visual gyroscope methodology, described in greater detail below, may be used to compute an estimate of the current heading of a vehicle, provided that the initial heading of the vehicle is known. Over the course of time, the error in estimating the heading may accumulate at a slow rate. However, when used with odometer 54, the visual gyroscope method of the present invention permits the system to estimate the vehicle's position for dead-reckoning, if required.

The method of the invention associated with the visual gyroscope embodiment will now be described in detail. The system begins the visual gyroscope calculation by extracting the image strips 46 from two successive images as described above. The computer 58 is also programmed to monitor the odometer 54 to determine how far the associated vehicle has travelled between the times that the extracted images were taken, and an internal clock (not shown) is used to determine the time intervals. In a prototype system of the present invention, the time interval ranges from 0.3 to 2 seconds, and the distance the vehicle has travelled is typically between 0 and 50 meters within the time interval.

The two extracted image strips are compared to estimate the amount of rotation the vehicle has undergone during the time interval between the two images. A range of possible rotations of the second strip are compared to the first strip to determine which rotation gives the best match. The range is determined from the distance and time intervals, in accordance with physical constraints upon how far a vehicle can turn in a given time and distance.

The best match between the first strip and rotations of the second is computed by the sum of the absolute value of the differences (SAVD). The rotation with the smallest match score is chosen as the correct match. For example, if rotating the second strip 15 degrees gives the best match to the first strip, then the vehicle is assumed to have turned 15 degrees during the interval between the images from which the strips came. An algorithm, given in pseudo-code for computing a turn increment, is as follows:

```
range_of_rotations = MIN(180,
    time_interval * max_degrees_per_second,
    distance_interval * max_degrees_per_meter)
best_match = infinity
for i = -range_of_rotations to +range_of_rotations:
    second_strip_rotated=rotate(second_strip,i)
    match_compute_SAVD(first_strip,
        second_strip_rotated)
    if match < best_match:
        best_match = match
    rotation = i
```

More specifically, the present method of computing the degree of turn between successive strips gives an estimate of the incremental turn. Note that typically it takes more than two successive images to complete a turn. Also, incremental turns are typically less than 15 degrees. However, the method is required to detect turns on the order of 90–180 degrees. The visual gyroscope of the present invention for providing a turn detector does so by integrating the incremental turn over a number of successive strips. In operating an engineering prototype of the present system on city streets, the inventors determined that turns may take up to 30 meters from start to finish. As a result, in one embodiment of the invention, the inventors integrate the results obtained from the visual gyroscope over distances of 30 meters. The odometer 54 provides information indicative of the completion of each 30 meter travel by the vehicle. For each new incremental turn reading, the system is programmed to add all incremental turns measured over the previous 30 meters to determine an integrated turning method. The integrated measurement is then rounded to the nearest 90 degrees, for permitting the detection of right, left, and u-turns substantially immediately after they are completed, thereby permitting the determination of the direction that the vehicle has turned at each intersection. An algorithm used in this embodiment of the invention to accomplish detection of the turn direction is shown below in pseudo-code:

```
complete_turn = 0
for i = current_odometer downto current_odometer-30:
    rotation = turn_increment(strip[i], strip [i-1])
    complete_turn = complete_turn + rotation
rounded_turn = round_to_nearest-90(complete_turn)
if rounded_turn = -180:
    output(U-turn)
if rounded_turn = -90:
    output(Left turn)
if rounded_turn = 90:
    output(Right turn)
if rounded_turn= 0:
    output(No turn)
```

More generally, the integrated measurement may be rounded to the closest possible turn to handle cases of non-square intersections such as Y-intersections.

In summation, to detect turns, small visual gyro or turn detector 55 readings are accumulated in memory for a distance of up to 30 meters (the empirical maximum length of a turn), in this example. However, the inventors have developed a scheme to detect turns as they are happening and to determine when they are completed. Buffering or gyro reading accumulation is initiated when the current measured turn is at least 5 degrees, and the change in the odometer reading (in meters) is no more than the turn (in degrees). Turn data is continuously added to the buffer memory in computer 58 as long as either of the following two conditions hold:

1) The vehicle is not moving (the odometer 54 reads 0 meters and visual gyro 55 reports 0 degrees), or
2) All of the following hold:
   Accumulated odometer 54 readings (including the present one) since the start of buffering do not exceed 30 meters;
   Either,
      a) On the previous iteration, the magnitude of the turn (in degs) was at least equal to the distance travelled (in meters)
      or b) The current measured turn is at least 5 degrees, and the change in the odometer 54 reading (in meters) is no more than the turn (in degrees).
   Either,
      a) The combination of the current and preceding turn measurements is at least 8 degrees in magnitude,
      or b) Both of the following hold:
         The total buffered turn (in degrees) is at least twice the total buffered distance (in meters).
         The sum of the current and previous odometer changes are no more than 5 meters.

Once bufferings ends, the total accumulated visual gyro 55 readings are taken from that period as being a "turn". In cases where all turns are expected to be at right angles, the sum of buffered angles is rounded to the nearest multiple of plus or minus 90 degrees.

The above turn detection algorithm, together with signals from odometer 54, is used to determine the position of the associated vehicle on a map shown on display 53 as the vehicle travels along the premapped route, such as a course laid out over city streets. Note that the system is initialized by having the vehicle begin at a known starting position. As previously indicated, odometer 54 provides signals indicative of the approximate distance the vehicle has travelled along portions of a street, for example, and such odometer signals are used to determine when the vehicle is close to an intersection. At each intersection, the present visual gyroscope or incremental turn detector 55 determines whether the vehicle has proceeded to go straight, turn right, turn left, or has made a u-turn. In this manner, the present system determines the location of the vehicle at all times. Note that the use of the skeleton map 71, in conjunction with the visual gyroscope 55, 55' embodiment of the invention is considered a preferred method of operating the present system.

An alternative embodiment of the present invention, where a map of the particular roadway a vehicle is to be tracked on is not available, dead-reckoning can be utilized in conjunction with the visual gyroscope embodiment of the invention. As with the preferred embodiment, the system is initialized with a known starting position, and also a known heading. Each successive computed turn increment is added to the previous heading to give a new heading. The new heading determines the direction of the vector corresponding to vehicle motion. The distance increment given by odometer 54 determines the length of that vector. The vector is added to the previous position to give the new position of the vehicle. In this manner, the vehicle's current position is estimated at all times.

Typically, dead-reckoning techniques are not as reliable as the aforesaid preferred technique incorporating a map of the vehicle route. In dead-reckoning, the estimate of the current position is dependent upon the sum of all previous measurements. As a result, any errors made in the previous measurements will be cumulative, causing an increasing error over time. Accordingly, in using dead-reckoning it is not possible to realign estimates of the vehicle's position with the correct location. In contrast, when using the preferred map technique or method as described above, confining the vehicle's position to valid road positions prevents the error from becoming arbitrarily large, in that each valid position provides a correct location of the vehicle.

Although various embodiments of the present invention have been shown and described above, they are not meant to be limiting. For example, those of skill in the art may recognize various modifications to the embodiments shown, which modifications are meant to be covered by the spirit and scope of the invented claims.

What is claimed is:

1. A visual gyroscope, or yaw detector system for detecting the travel of a vehicle along a route, regardless of whether the vehicle makes turns or heads straight during such travel, comprising:
   visual image detecting means mounted on said vehicle, for producing successive digitized image data strips including information relating to features of scenery about said vehicle at successive locations or landmarks along the route, respectively;
   means for extracting two of the successive image data strips;
   means for rotating the second occurring image data strip until it matches the first occurring image data strip, and for measuring the amount of rotation of the former to obtain a match with the latter such that the measured amount of rotation is indicative of the turn direction and of the degree the vehicle turned in the time interval between the two successive image data strips.

2. The system of claim 1, wherein said visual image detecting means includes means for detecting color.

3. The system of claim 1, further including odometer means for providing signals indicative of the distance said vehicle travels between locations associated with said image data strips, respectively.

4. The system of claim 3, further including means responsive to said odometer signals for indicating the distance said vehicle travelled in making the measured amount of rotation between the successive two image data strips.

5. The system of claim 4, further including turn direction means responsive to the turn direction for indicating whether said vehicle is making or has made a turn, including left-turns, right-turns, u-turns, and other types of turns.

6. The system of claim 4, further including:
   means for forming a skeleton map of a network of roads for use in constraining the position of said vehicle to said roads; and
   means responsive to said odometer signals and to the degree of vehicle turning from said rotating means for insuring constraining the vehicle's estimated location to be on said skeleton map.

7. The system of claim 4, further including heading means receptive of both a signal indicative of the initial heading of said vehicle, and of said turn direction for providing the heading of said vehicle at any given time.

8. The system of claim 7, wherein said heading means includes means responsive to said vehicle heading in a straight pattern for indicating the end of a turn.

9. The system of claim 8, further including:
   said extraction means including means for extracting each sequentially occurring pair of successive image strips; and
   said rotating means including means for accumulating and summing the measured rotations and distances of each sequentially occurring pair of successive image strips, for providing the total rotation made and distance travelled by the vehicle in turning.

10. The system of claim 9, wherein said rotating means further includes means indicating a u-turn, left-turn, right-turn or straight travel, if rounding of the accumulated measured rotations is −180°, −90°, +90°, or 0°, respectively, or rounding to a nearest plausible turn angle to handle cases of non-square intersections, such as Y-intersections, whereby plausible is determined by assuming the vehicle to be on a real roadway in a street map and assuming it to remain on a real roadway after the turn.

11. The system of claim 10, further including:
   a map display responsive to said odometer signals, and to said measured amount of rotation, for displaying the position of said vehicle thereon as it traces travel along a route, whereby said system is initialized by having said vehicle begin at a known starting position on said route.

12. The system of claim 10, further including dead reckoning means for extracting the current position of said vehicle at all times.

13. The system of claim 12, wherein said dead reckoning means includes:
   means for initializing said system with a known starting position and a known heading;
   means for adding each measured turn increment to the previous heading to obtain a new heading for determining the direction of a vector corresponding to vehicle motion; and
   means for adding each successive distance measured by said odometer means between every two successive image data strips, to said vector for the previous position of the vehicle, for obtaining the vehicle's current position.

* * * * *